Jan. 12, 1960 W. DOETSCH 2,920,539
MANUFACTURE OF ENVELOPES
Filed June 7, 1955 11 Sheets-Sheet 1

Inventor
WILHELM DOETSCH
BY Robert H. Jacob
AGENT

Jan. 12, 1960   W. DOETSCH   2,920,539
MANUFACTURE OF ENVELOPES
Filed June 7, 1955   11 Sheets-Sheet 2

Inventor
WILHELM DOETSCH
BY Robert H. Jacob
AGENT

Jan. 12, 1960  W. DOETSCH  2,920,539
MANUFACTURE OF ENVELOPES

Filed June 7, 1955  11 Sheets-Sheet 5

Fig.6

Inventor
WILHELM DOETSCH
BY Robert H. Jacob
AGENT

Jan. 12, 1960 W. DOETSCH 2,920,539
MANUFACTURE OF ENVELOPES
Filed June 7, 1955 11 Sheets-Sheet 6

Fig.7

Inventor

WILHELM DOETSCH

BY Robert H. Jacob
AGENT

Fig.8

Jan. 12, 1960 W. DOETSCH 2,920,539
MANUFACTURE OF ENVELOPES
Filed June 7, 1955 11 Sheets-Sheet 8

Inventor
WILHELM DOETSCH
BY Robert H. Jacob
AGENT

Jan. 12, 1960 W. DOETSCH 2,920,539
MANUFACTURE OF ENVELOPES
Filed June 7, 1955 11 Sheets-Sheet 9

Fig.10

Inventor
WILHELM DOETSCH

BY Robert H. Jacot.
AGENT

United States Patent Office 2,920,539
Patented Jan. 12, 1960

2,920,539
MANUFACTURE OF ENVELOPES

Wilhelm Doetsch, Neuss (Rhine), Germany

Application June 7, 1955, Serial No. 513,859

3 Claims. (Cl. 93—63)

Various methods have been proposed for the manufacture from a paper web of envelopes having gummed closing flaps. In this connection a distinction is made between two different ways of securing the parts of the envelope together by adhesive, that is to say those having two-seam adhesion, and those having adhesive seams extending diagonally over the envelope i.e. envelopes of the five-seal format. The latter are made from blanks of either rectangular or parallelogram shape. In order to manufacture these blanks it is necessary for widely differing cutting angles to be produced. In the methods previously proposed the direction in which the paper web runs up to the fabricating machine is changed for this purpose as required, and this makes it necessary to swing the whole machine support which carries the roll of paper in order to achieve a different shape of blank. This has the disadvantage that the blanks after their separation from the paper web have to be fed to the fabricating machine with a considerable change in the direction of motion. The further fabrication is therefore very difficult, because as a result of the angular run-off in the take-over or acceptance, displacements frequently occur which upset considerably the succeeding gumming and folding operations especially in the case of thin and delicate papers. In the machines previously proposed for the manufacture of envelopes having two-seam adhesion a change in the direction of movement is not necessary as the adhesive seams extend parallel to the direction of conveyance or movement of the paper web. Envelopes of the five-seal format cannot be manufactured on these machines because the direction in which the paper web runs up has to be changed for that purpose. On the other hand envelopes with two-seam adhesion cannot be produced on the first-named machines.

In accordance with the invention the above-mentioned disadvantages are to be avoided, it being possible to produce sheet-paper blanks in any angle of cut without change of the direction of movement and manufacturing them further with a constant conveying direction. The apparatus of the invention also enables the manufacture of envelopes to be effected from a pile of blanks.

According to the invention the sheet-paper blanks which are separated from the paper web are swung by way of a conveyor path without change in the direction of movement into the position necessary for folding and adhesion. As a result of cutting out of the sections or notches at the fold corners the blanks are then given their final outline and are ready folded and stuck. The folded and stuck envelopes are then laid under and behind one another in staggered fashion, provided on the borders of the closing flaps with adhesive, dried, and subsequently collected into a pile while closing the closing flaps.

A further feature of the method or process according to the invention resides in the fact that the adhesive for the closing flaps is applied to the paper band first at the intervals of the sheet-paper blanks which are later to be separated from the paper web and the applied adhesive dried by leading the paper web over heating means, whereupon the necessary sheet-paper blanks are separated from the paper web and are swung into the position necessary for folding and sticking. The drying operation is considerably accelerated if, as is preferable, there is direct contact with the heating means.

Further features of the invention appear from the following description with the attached drawings, which illustrate an example of carrying out the invention.

The scheme of the method or process according to the invention may be seen from Figures 1, 2, 3, 4.

In Figures 1, 2, 3 and 4 the individual steps in the method or process are indicated by the numerals I–VIII.

Figure 1:
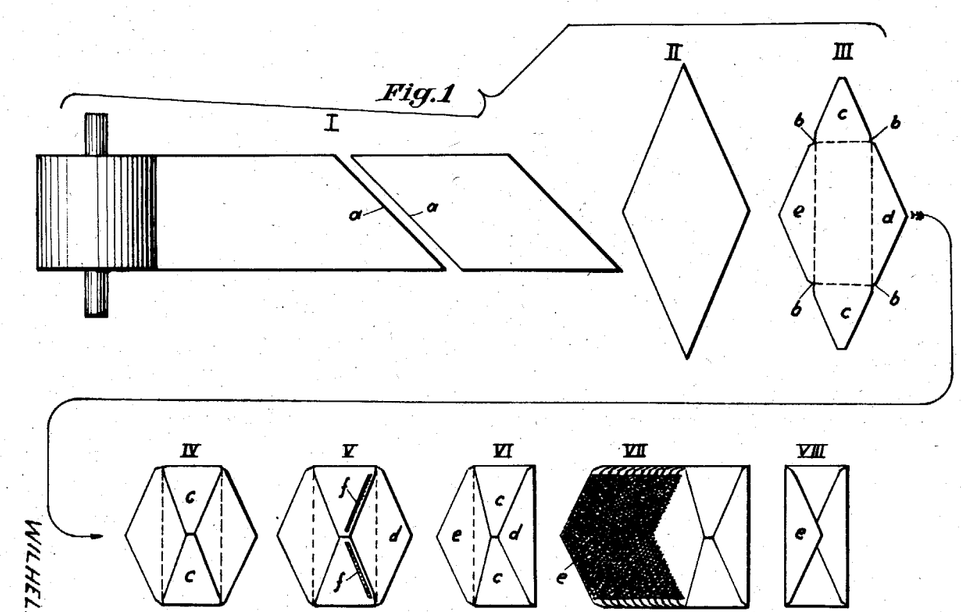

For the process of Fig. 1, which is explained by way of example, blanks are chosen which have the shape of a parallelogram. According to stage I of the process the individual sheet-paper blanks are separated along the lines $a$ from the paper web and swung by way of a conveyor path, without a change in the direction of motion, into the position necessary for folding and application of adhesive according to II. By cutting out the sections or notches $b$ of the fold corners the blank is given its final outline, the side flaps $c$, the bottom flap $d$ and the mouth flap $e$ being formed along the dotted lines according to III. In the further course of the process there is effected, according to IV—VI, the folding-over of the side flaps $c$, the application of the adhesive $f$ and the folding-over and sticking of the bottom flap $d$. The ready folded and stuck envelopes are led continuously over and behind one another in staggered fashion with closing flaps which are still open, and provided according to VII with adhesive on the borders of the closing flaps and dried. Subsequently the envelopes are collected one by one into a pile with closing of the closing flaps.

Figure 5:
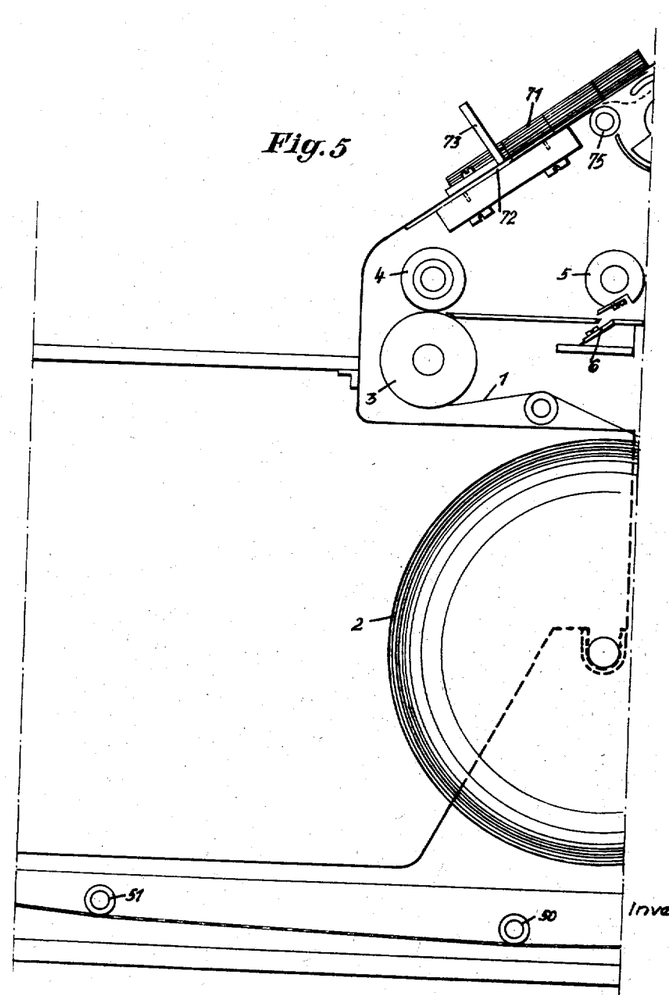
Figs. 5, 6, 7, 8, arranged in a row along the dot-and-dash lines provide a longitudinal section through an apparatus for carrying out the method or process.
Figure 7:
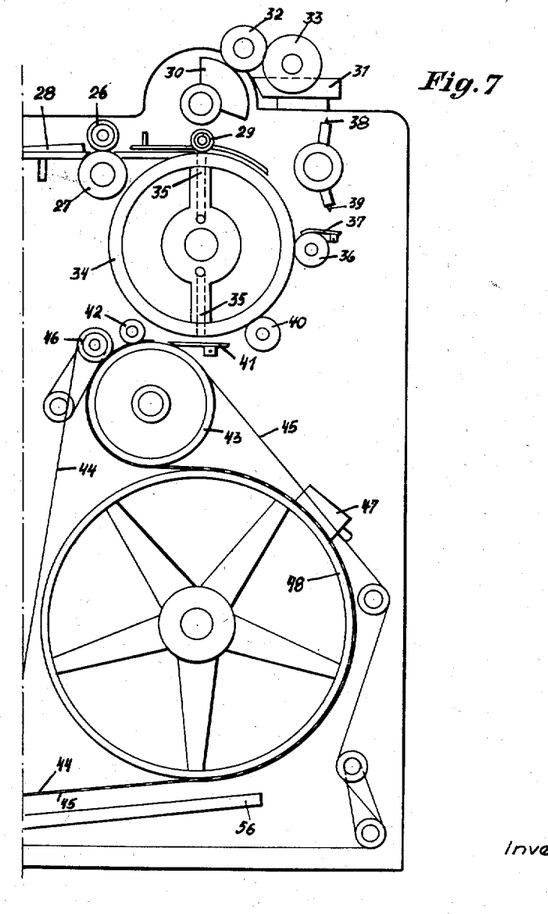
Figure 8:
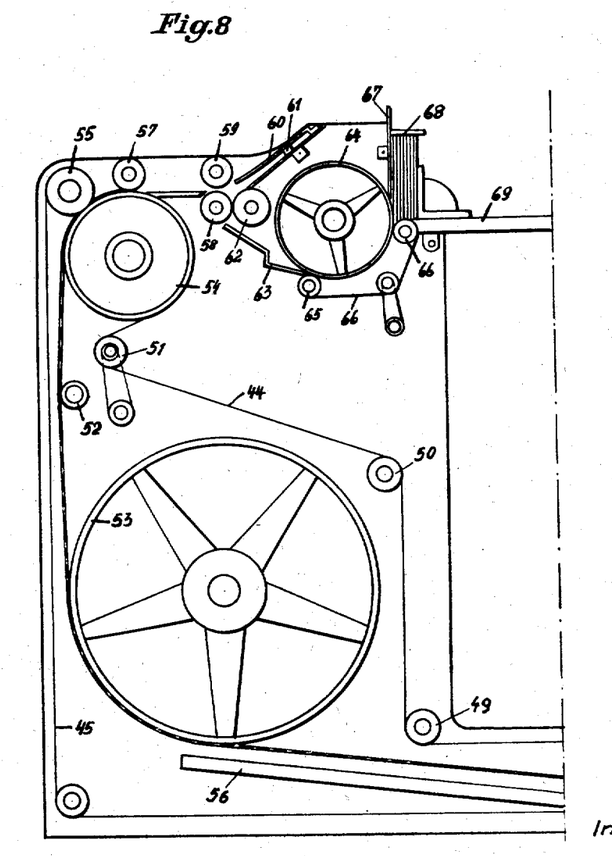
Figure 10:
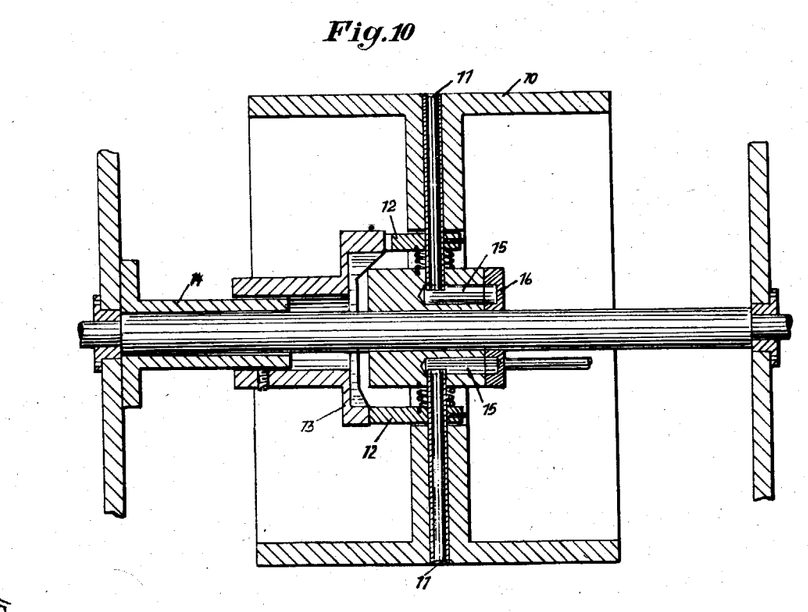
Fig. 10 is a cross-section through the part serving for the conveying and swinging of the sheet-paper blanks.
Figure 11:
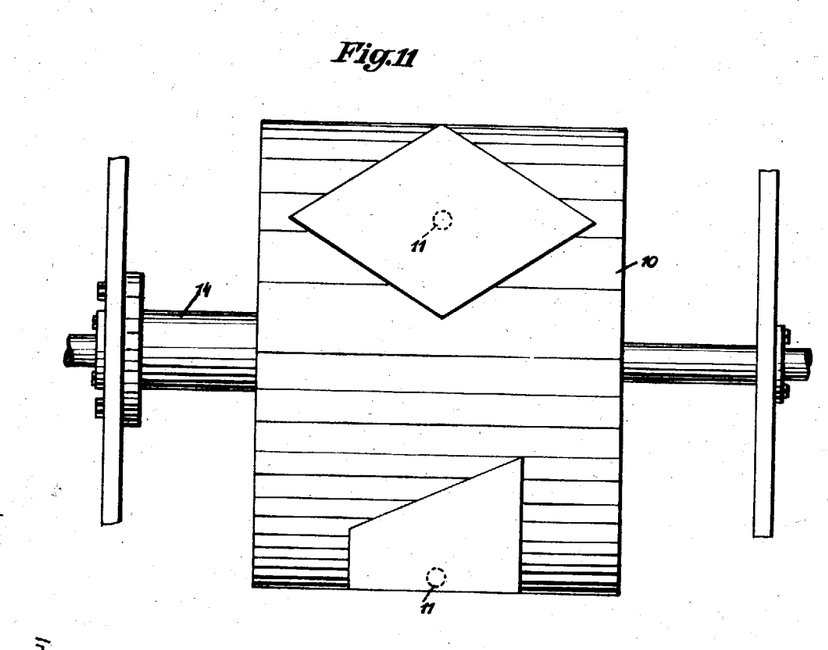
Fig. 11 is a plan on the part of the apparatus of Figure 10.

According to Figure 5 the draw rollers 3, 4 serve to draw the paper web 1 from the roll of paper 2. The paper web 1 is fed to the cutting mechanism 5, 6, by the draw rollers 3, 4. During the passage through the cutting mechanism the appropriate blank is separated from the paper web along the line $a$ (Fig. 1, I) by the upper cutter roller 5. The cutter mechanism 5, 6 is followed by rollers 7, 8 (Fig. 6) of which the roller 8 is made as a suction roller. The blank which has been separated from the paper web 1 is taken over by the rollers 7, 8, and passed over to the conveyor and turning drum 10 by means of the suction holes 9. Inside the turning drum 10, Figs. 6 and 10, there are, according to the invention, rotatable suction nozzles 11 which are operated by levers 12 by way of eccentrics 13, Fig. 10. As a result of displacement of the eccentrics 13 supported on the bushing 14 there is effected a more or less substantial rotation of the suction nozzles 11. The suction nozzles 11 are connected to the suction valve 16 by way of the ducts 15. On rotation of the conveying and turning drum 10, Fig. 11, the blank sucked up by the suction nozzles 11 is swung into the position necessary for folding and sticking (according to Fig. 1, II). Passing off from the conveying and turning drum 10, Fig. 6, the blank is held by the suction holes 17 of the roller 18 and passed to the knife roller 19, on which the cutting knives 20 are adjustably arranged. The blank is taken over by the suction holes 21 of the knife roller 19 and in conjunction with the upper cutting roller 22 portions or notches $b$ of the fold corners are cut out by means of the knives 20 (Fig. 1, III). After the blank has thus received its final outline, it is in conjunction with the roller 23, delivered to the further conveying and working rollers 24, 25, 26 and 27, Fig. 7. During the passage through these rollers, the two side flaps $c$ (Fig. 1, IV) are folded over by the folding loops 28. The gumming device 30 is arranged between the subsequent rollers 29, which gumming device receives the adhesive from the glue rollers 32, 33 mounted in the glue box 31. During the passage through the rollers 29 and 34, the adhesive $f$ (Fig. 1, V) is applied to the folded-over side flaps $c$, by the gumming device 30. The suction holes 35 of the stagger roller 34 take hold of the arriving blank directly at the bottom fold position. On the way to the roller 36, which is covered by a guide 37, the preliminary folding of the bottom and mouth flaps is effected by means of the pre-folding or creasing knives 38, 39 for the easier and accurate folding-over of the same. The bottom flap $d$, which lies ahead in the conveying direction, slides over the guide 37 and on passage through the roller 36, is stuck to the two side flaps $c$ (Fig. 1, VI). The suction holes 35 bring the folded and stuck envelope in cooperation with the roller 40 over the guide plate 41 into the rollers 42, 43, which rotate at reduced speed. The envelopes are here led together continuously above and behind one another in staggered fashion and taken over by the pairs of conveyor belts 44, 45. The roller 46 assists entry into the conveyor belts 44, 45 which convey the staggered layer of blanks (Fig. 1, VII) through beneath the gum box 47. During the passage of the layer of blanks over the roller 48 the free borders of the closing flaps are provided with adhesive and dried on their path over the rollers 49, 50, 51, 52 and 53 (Fig. 8) to the deviation rollers 54, 55. In order to accelerate drying a heating box 56 is arranged along the path from the belt drum 48 to the drum 53 which box directs hot air against the layer of gum. The layer of blanks which comes out of the pairs of belts 44, 45 at the deviating rollers 54, 55 pass into the draw-off rollers 58, 59, remaining at first still between the rollers 54, 55. The roller 55 is so adjustable that the blank which at any instant is lying uppermost and forward is released at the instant it is seized by the rollers 58, 59. The rollers 58, 59 convey the seized blank into the folding pocket 60 against the stops 61. The closing flap $e$ (Fig. 1, VIII) being folded over between the rollers 58, 62 with reversal of the direction of movement. The finished blank leaving the rollers 58, 62 passes by way of the guides 63 into the distributing or storage discs 64 and their counter rollers 65 with the belts 66 and is conveyed by way of the plate 67 against the stops 68 and deposited on the table 69.

Figure 2:
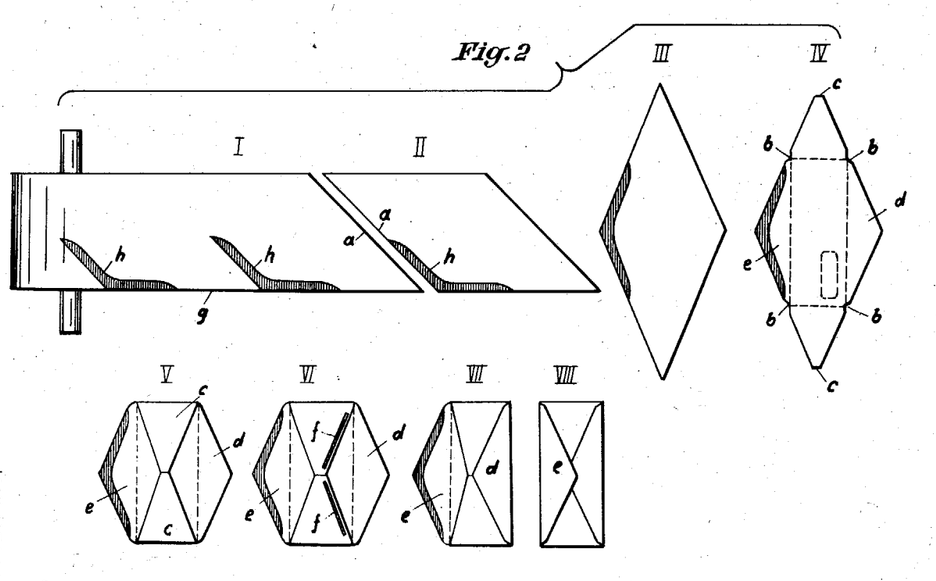
Figure 3:
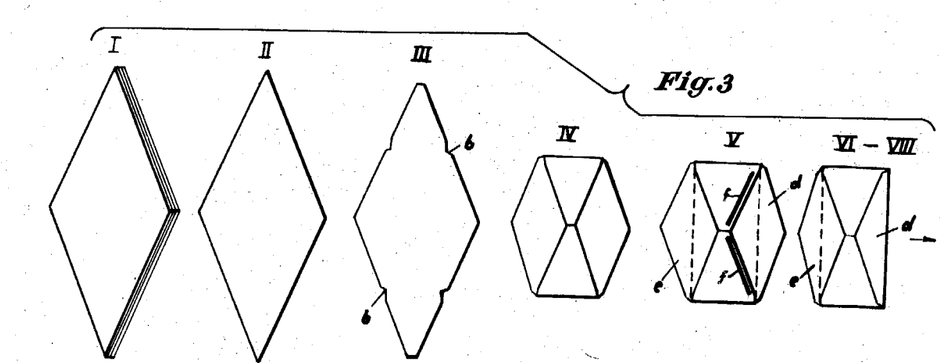
Figure 4:
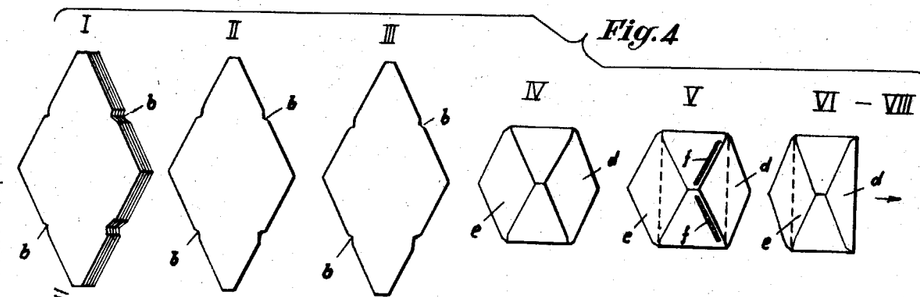

In the method of Fig. 2, I–VIII, now to be explained by way of a further example, the adhesive $h$ for the later sticking of the closing flaps, is applied according to stage I of the method by a shaped gumming device along the edge $g$ and the lines of cut, at the same intervals as those of the sheet-paper blanks which are later to be separated from the paper web. Subsequently the paper web is led over heating means and so that drying of the applied adhesive is effected. The sheet-paper blanks are then separated from the paper web along the lines $a$, II and swung into the position III which is necessary for folding and sticking. By cutting out the sections or notches $b$ of the fold-corners, the blank is given its final outline, the side flaps $c$, the bottom flap $d$ and the mouth flap $e$ being formed along the dotted lines. In the further course of the finishing operation there is then effected according to V–VIII the folding-over of the side flaps $c$, the application of the adhesive $f$, the folding-over and sticking of the bottom flap $d$, as well as the closing of the closing flap $e$.

Figure 9:
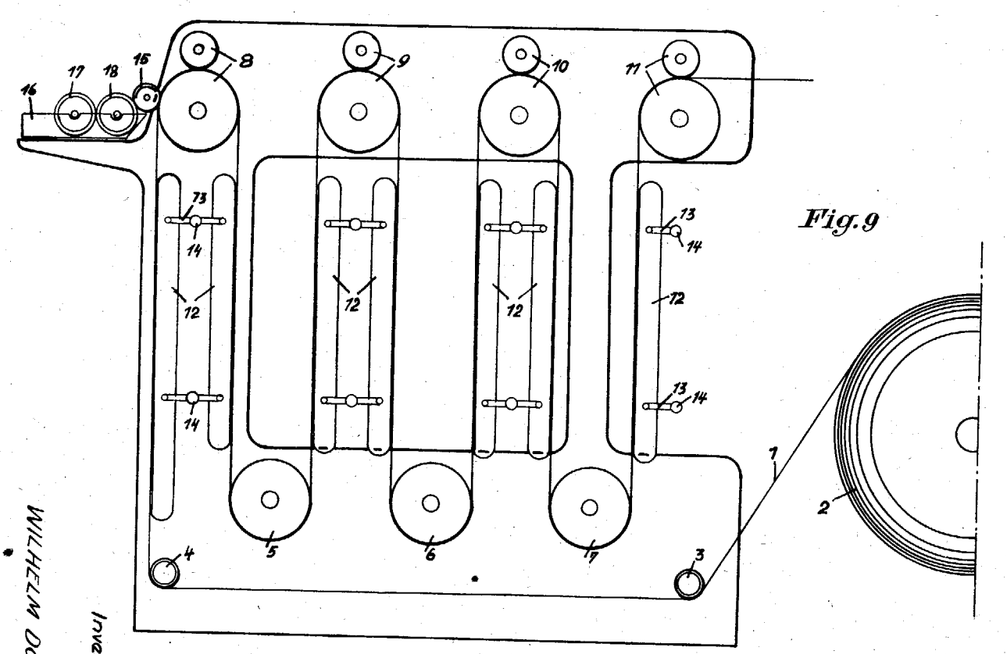
Fig. 9 is a longitudinal section of the apparatus for carrying out the method or process according to Figure 2.

In the apparatus illustrated in Fig. 9 for carrying out the method according to Fig. 2, the pairs of draw rollers 8, 9, 10, 11, serve to draw off the paper web 1 from the roll of paper 2, by way of the guide rollers 3, 4, 5, 6, 7. According to the invention heating means 12 are arranged on both sides of the space enclosed by the paper web, between the lower draw rollers 8, 9, 10, 11 and guide rollers 4, 5, 6, 7. The heating means 12 are secured by set screws 13 on the traverses or cross members 14, so that the heating means can be brought more or less into contact with the paper band which is guided over them. In front of the upper draw roller 8 there is arranged adjoining the lower roller the shaped gummer 15, which receives adhesive from the rollers 17, 18 mounted in the glue box 16. After application and drying of the adhesive has been effected, the folding and sticking of the envelopes is carried out in the manner previously described. For the manufacture of envelopes from stampings on the above machine there is arranged according to the invention, adjoining the device for the separating of the sheet-paper blanks from the paper web, the device for the taking-off of individual sheets from the pile of sheets. The technical advance consists in the fact that work may be carried out from the pile of sheets as well as from the roll of paper or even from both arrangements at the same time for the purpose of lining.

Figure 6:
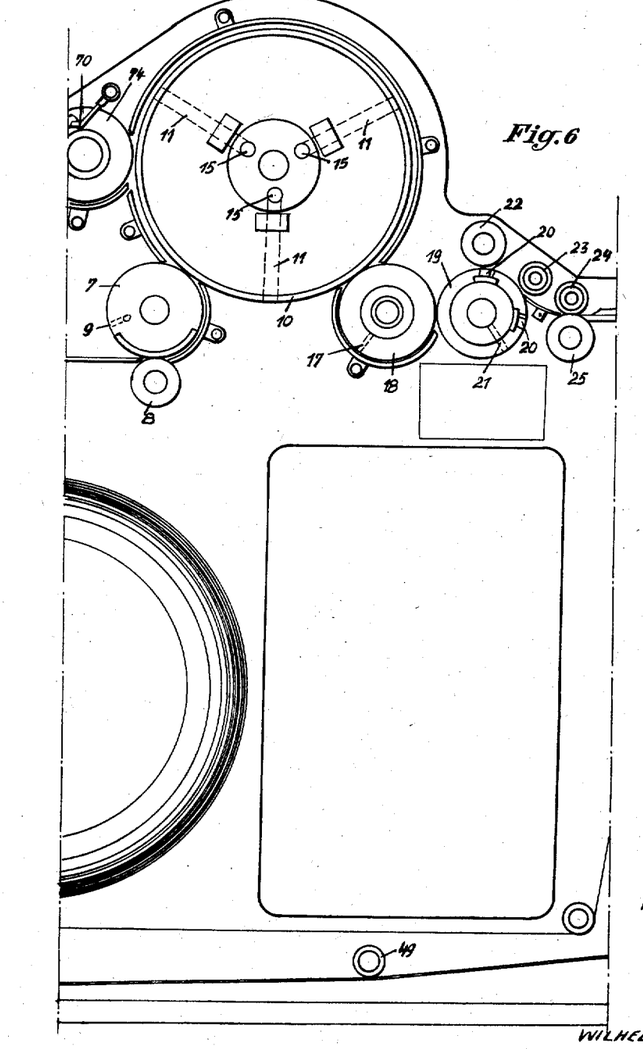
Figure 12:
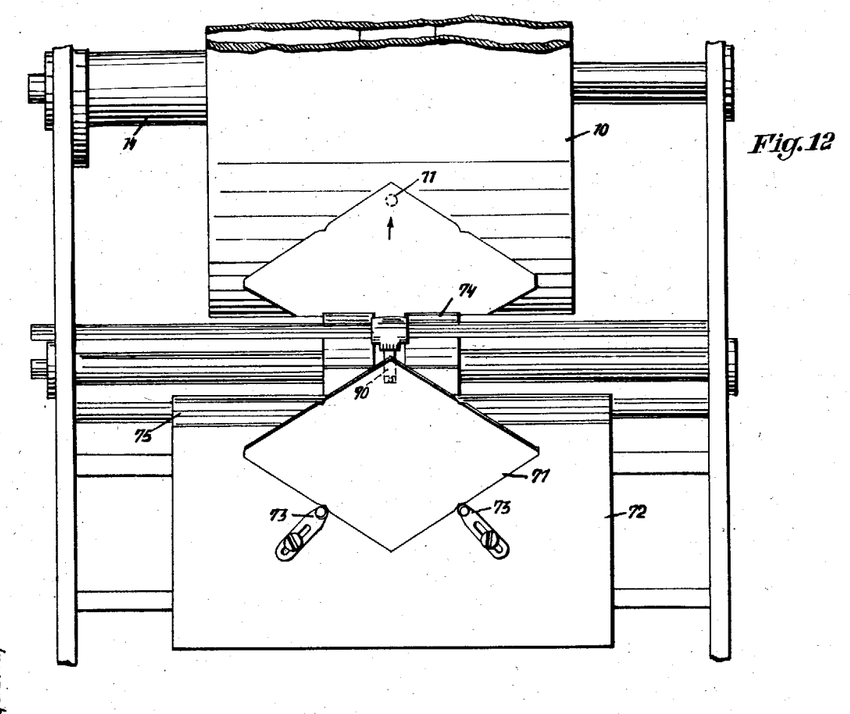
Fig. 12 illustrates an apparatus for the removal of sheet-paper blanks which have been ready prepared.

In the apparatus illustrated in Figs. 5 and 6 connected together on the dot-and-dash lines, the suction device 70 serves to draw off the lowest sheet from the pile of sheets 71 resting on the pile plate 72 and is carried by the holder 73. The sheet which has been drawn in from the pile of sheets by means of the suction device 70, as soon as it comes into the range of the segmental roller 74, is seized by the latter and in cooperation with the roller 75 completely drawn off from the pile 71 and passed over to the conveying and turning drum 10, Fig. 12. Further processing is effected in a similar way to that previously described.

I claim:

1. A machine for making envelopes from a web of paper mounted on a roll, said machine comprising roller means extending in parallel alignment with said roll for drawing said web from said roll, a cutting device including a cutter roller for cutting said web into blanks having parallel sides, conveying means and turning means constituted by a roller provided with a rotatable pneumatic nozzle adapted to advance and reorient said blanks, a transfer roller provided with suction means and a cutting roller operatively associated with said transfer roller for cutting folding notches into said blanks, means including cooperating rollers adapted to advance said blanks while folding side flaps defined in said blanks toward each other, a gumming device including glue rollers for applying adhesive to said side flaps, means adapted to feed said blanks in staggered, aligned condition to a conveyer means, means including prefolding knives for preliminary creasing of said blanks to define the bottom and closure flaps, means including a roller for folding said bottom flaps over said gummed side flaps, and conveyer means including belt means, rollers and pulleys operative to receive and advance said blanks, draw off means disposed endwise of said conveyer means and a folding pocket in receiving relationship to said draw off means operative to fold the closure flaps of said blanks forming the envelopes.

2. A machine for making envelopes from a web of paper mounted on a roll, said machine comprising roller means extending in parallel alignment with said roll for drawing said web from said roll, a cutting device including a cutter roller for cutting said web into blanks having parallel sides, conveying means and turning means including a roller provided with a pneumatic nozzle adapted to advance and reorient said blanks, a transfer roller provided with suction means and a cutting roller operatively associated with said transfer roller for cutting folding notches into said blanks, means including cooperating rollers adapted to advance said blanks while folding side flaps defined in said blanks toward each other, a gumming device including glue rollers for applying adhesive to said side flaps, means including a staggering drum provided with pneumatic means including suction holes adapted to feed said blanks in staggered, aligned condition to a conveyer, means including rotary prefolding knives operating in synchronism with said staggering drum for applying preliminary creases to said blanks to define the bottom and closure flaps, means including a folding roller cooperating with said staggering drum in folding bottom flaps over the gummed side flaps, and conveyer means, including belt means, a conveyer roller and pulleys, operative to receive and advance said blanks, draw off means disposed endwise of said conveyer means and folding means in receiving relationship to said draw off means operative to fold the closure flaps of said blanks forming the envelopes.

3. A machine in accordance with claim 2 provided with a pile plate adapted to receive a stack of blanks and means for drawing off individual blanks from the stack, said pile plate and means for drawing off said blanks being disposed ahead of said transfer roller in a manner to be fed from said stack of blanks independently of said roller means for drawing said web from said roll.

References Cited in the file of this patent

UNITED STATES PATENTS

| | | |
|---|---|---|
| 974,621 | Ackerman | Nov. 1, 1910 |
| 1,043,278 | West | Nov. 5, 1912 |
| 1,123,617 | Stone | Jan. 5, 1915 |
| 1,265,987 | Banzett | May 14, 1918 |
| 1,289,084 | Banzett | Dec. 31, 1918 |
| 1,291,089 | Novick | Jan. 14, 1919 |
| 2,694,351 | Winkler et al. | Nov. 16, 1954 |